US005379706A

United States Patent [19]
Gage et al.

[11] Patent Number: 5,379,706
[45] Date of Patent: Jan. 10, 1995

[54] SEED DISTRIBUTION SYSTEM FOR PLANTERS AND DRILLS

[75] Inventors: Charles A. Gage, Celina; Theresa Sturwold, Coldwater, both of Ohio

[73] Assignee: AGCO Corporation, Norcross, Ga.

[21] Appl. No.: 43,563

[22] Filed: Apr. 7, 1993

[51] Int. Cl.$^6$ .............................................. A01C 15/04
[52] U.S. Cl. .................................. 111/175; 111/174;
   406/41; 406/133; 406/142; 406/143; 406/146
[58] Field of Search .................. 111/174, 175; 406/39,
   406/41, 132, 135, 141-143, 146

[56] References Cited

U.S. PATENT DOCUMENTS

| | | | |
|---|---|---|---|
| 2,726,121 | 12/1955 | Delaphaine | 406/143 |
| 3,548,765 | 12/1970 | Guataloup | 111/174 |
| 3,858,763 | 1/1975 | Mack | 406/133 |
| 3,888,387 | 6/1975 | Deckler. | |
| 4,280,419 | 7/1981 | Fischer. | |
| 4,296,695 | 10/1981 | Quanbeck. | |
| 4,450,979 | 5/1984 | Deckler. | |
| 5,161,473 | 11/1992 | Landphair et al.. | |

FOREIGN PATENT DOCUMENTS

| | | | |
|---|---|---|---|
| 338647 | 10/1989 | European Pat. Off. | 111/174 |
| 8801011 | 11/1989 | Netherlands | 111/174 |
| 420266 | 3/1974 | U.S.S.R. | 111/174 |
| 459181 | 2/1975 | U.S.S.R. | 111/174 |
| 759063 | 8/1980 | U.S.S.R. | 111/175 |
| 1175376 | 8/1985 | U.S.S.R. | 111/175 |

*Primary Examiner*—Randolph A. Reese
*Assistant Examiner*—Spencer Warnick
*Attorney, Agent, or Firm*—Biebel & French

[57] ABSTRACT

A seed distribution system is provided for planters and drills wherein the distribution system includes a central hopper for supplying a plurality of seed metering units. A plurality of seed distribution units are mounted on a lower portion of the central hopper and each seed distribution unit includes a central tubular member defining an air column for entraining seeds to be distributed from the central hopper. A plurality of discharge outlets open into the air column for receiving seeds therefrom and for conveying the seeds through distribution tubes to metering unit bins associated with each of the seed metering units. In addition, each of the seed metering unit bins is provided with apparatus for adjusting the level of seed accumulated within the bin.

24 Claims, 4 Drawing Sheets

SEED DISTRIBUTION SYSTEM FOR PLANTERS AND DRILLS

BACKGROUND OF THE INVENTION

1. Field of the Invention

The present invention relates to a distribution system for use with a seed planter, and more particularly, to a seed distribution system for supplying seed to a plurality of seed metering units associated with the seed planter.

2. Description of Related Art

Distribution of seeds using a planter or seeder is typically accomplished by providing a seed metering unit for dispensing seeds from a hopper at a controlled rate into an underlying drop chute for conveying the seeds to a furrow. Examples of typical metering systems are disclosed in U.S. Pat. Nos. 3,888,387 and 4,450,979, both to Decklet, which disclose metering units for accurate metering and uniform distribution of seed. One problem associated with such metering units results from each metering unit being fed from a separate hopper or bin located above the metering unit such that each bin must be separately filled and emptied before and after a seeding operation. Thus, the servicing of individual bins for the metering units can be time consuming and inconvenient.

U.S. Pat. No. 4,296,695 to Quanbeck illustrates a seed distribution system which overcomes the problems associated with providing a plurality of seed bins for individual metering units. In this patent, a system is disclosed which provides a central seed hopper which distributes seed to a plurality of distribution tubes or hoses for supplying seed to furrow openers on a seeding apparatus. A disadvantage associated with such a distribution system is that it is not adapted to be used with a planter having individual metering units for each furrow. Thus, the seeds may become grouped together before they are dropped in the furrow, such that the spacing of the seeds within a furrow may be less uniform than if the metering apparatus were located directly adjacent to the furrow opener.

U.S. Pat. No. 5,161,473 to Landphair et al discloses a seed distribution system for overcoming some of the disadvantages associated with prior art seed distribution systems. The Landphair et al patent discloses a metering apparatus directly adjacent to each furrow opener as well as a main storage hopper to provide seed to a plurality of secondary hoppers associated with each of the metering devices. This device further includes a plurality of seed tubes for supplying seed to each secondary hopper wherein the seed tubes each include an input end located within the main hopper and an air tube which surrounds each seed tube to blow air into the main hopper whereby seeds are propelled through the seed tubes to respective secondary hoppers. Thus, each seed tube requires a separate air supply tube to force air and seed into the seed tube. Further, the amount of seed being fed through any particular seed tube will depend upon the position of the seed tube relative to the seed in the area of the tube such that the quantity of seed flowing through the seed tubes may vary from seed tube to seed tube. In such a distribution system, wherein there may be large variations in the flow of seed through the different seed tubes, it is necessary to provide secondary hoppers with a sufficient size to ensure that a sufficiently large reserve of seed is provided at each seed metering device to compensate for any interruption or unexpected decreases in the flow of seeds to any of the secondary hoppers.

It is desirable to provide a seed delivery system wherein a substantially uniform distribution of seed is provided to a plurality of secondary hoppers and wherein the size of the secondary hoppers is limited such that a minimum amount of seed is stored at each of the metering device sites. Thus, if it is necessary to remove the seed from the system, the labor and loss of seed involved in removing the seed stored in the system will be minimized.

SUMMARY OF THE INVENTION

It is therefore a primary object of the present invention to provide a seed distribution system including a main or central hopper and a plurality of bins associated with seed metering units on a seed planter or drill for receiving seed from the central hopper wherein a substantially even amount of seed is distributed over a given period of time to each of the bins such that the fill rate of the bins is predictable and a minimum reserve quantity of seed is required at each of the seed metering unit locations.

It is another object of the invention to provide a seed distribution system wherein the flow rate of seed through distribution tubes supplying a plurality of seed metering units may be simultaneously adjusted to ensure that a substantially uniform flow of seeds is provided to the plurality of seed metering units.

In one aspect of the invention, an apparatus is provided for distributing particulate material, such as seed, from a central hopper to at least one receiving unit, the apparatus comprising: column means defining an air column within the central hopper, the air column including an upper end and a lower end; a plurality of discharge outlets associated with the column means and located intermediate the upper end and the lower end; and an air supply for supplying air in a first direction to the air column, the air supply being capable of buoying the particulate material such that the particulate material may be distributed through at least one of the plurality of discharge outlets.

In a further aspect of the invention, the column means comprises a tubular member and the plurality of discharge outlets are spaced substantially evenly about the air column. In addition, an adjustable support means is provided including a support plate for supporting seed at a location below a lower end of the tubular member, and the support plate further defines an aperture for directing air into the central hopper. The adjustable support means is operable to adjust the location of the support plate relative to the lower end of the tubular member in order to adjust the flow rate of seed out of the central hopper via the air column and discharge outlets. In addition, the support plate may be positioned in contact with the lower end of the tubular member in order to prevent seed from flowing into the tubular member whereby flooding of the tubular member with seed is prevented when the system is not in operation.

In yet another aspect of the invention, a tubular column is provided having a plurality of discharge outlets, wherein each of the plurality of discharge outlets comprise distribution tubes coupled in fluid communication with the air column at a first end of the tubes for conveying the seed in a second direction which is generally transverse to the first direction of air flow through the air column. Each of the distribution tubes includes a second or discharge end which is operatively coupled to a metering unit bin associated with a respective seed metering unit for a planter. The discharge ends of the discharge tubes are movable within their respective metering unit bins to control the accumulation of material therein.

Other objects and advantages of the invention will be apparent from the following description, the accompanying drawings and the appended claims.

DESCRIPTION OF THE PREFERRED EMBODIMENT

Figure 1:
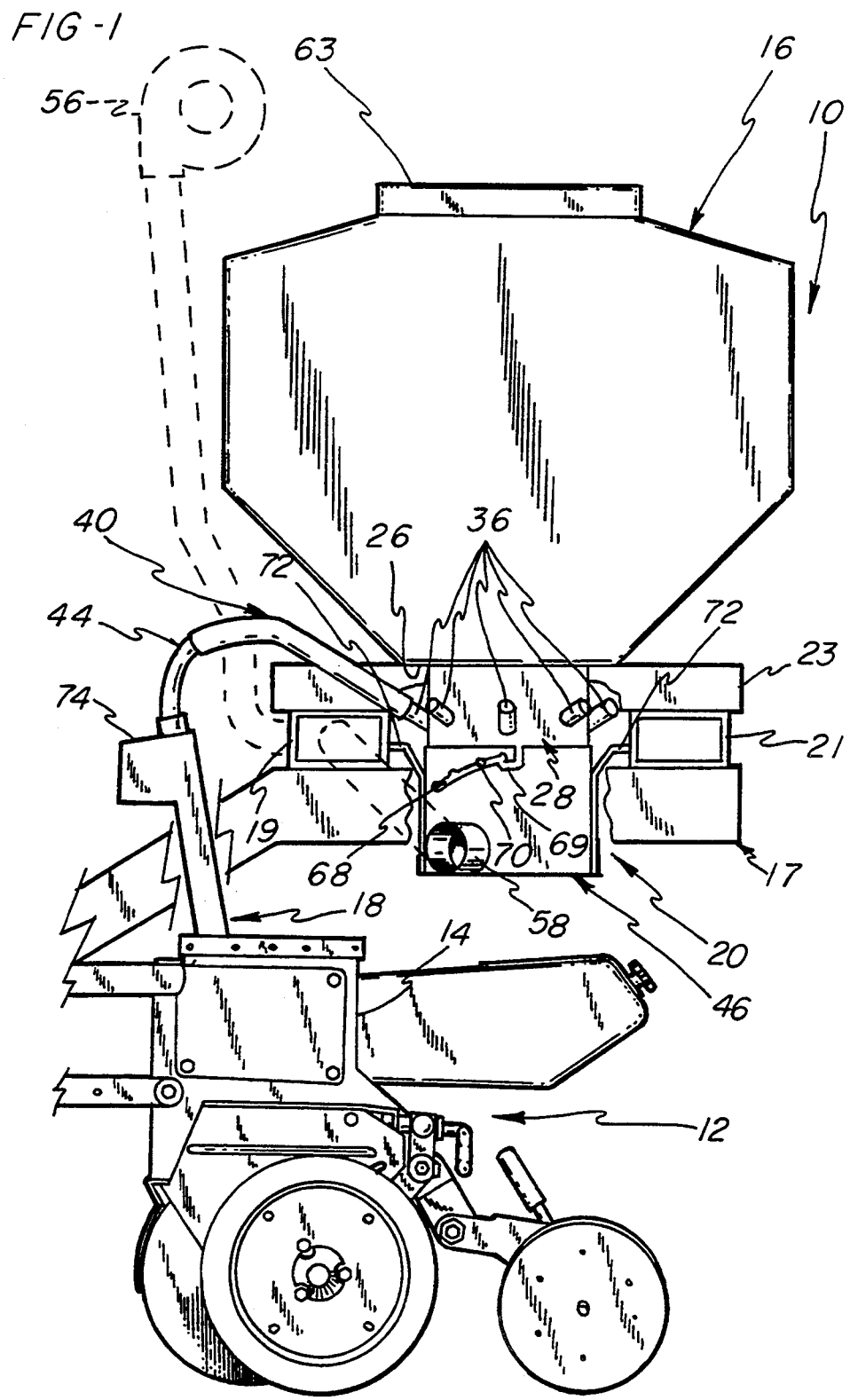
FIG. 1 is a side elevational view showing the seed distribution system of the present invention mounted to a planter having a plurality of seed metering units for dispensing seed.

Referring to FIG. 1, a seed distribution system 10 of the present invention is illustrated mounted to a conventional planter 12 incorporating a plurality of seed metering units 14 for uniformly distributing seed into furrows. The seed distribution system 10 generally includes a main or central hopper 16 for distributing seed (FIG. 2) to a plurality of seed metering unit bins 18 (FIG. 1) located on top of each of the seed metering units 14.

The central hopper 16 is supported on a support frame 17 which is attached to the planter 12 and which is shown partially cut away to permit clear illustration of the distribution system 10. The support frame 17 includes a pair of tubular support beams 19, 21 (shown in cross-section) extending along the planter 12 and cross-braces 23 spanning between the support beams 19 and 21 to engage and support the central hopper 16.

Figure 3:
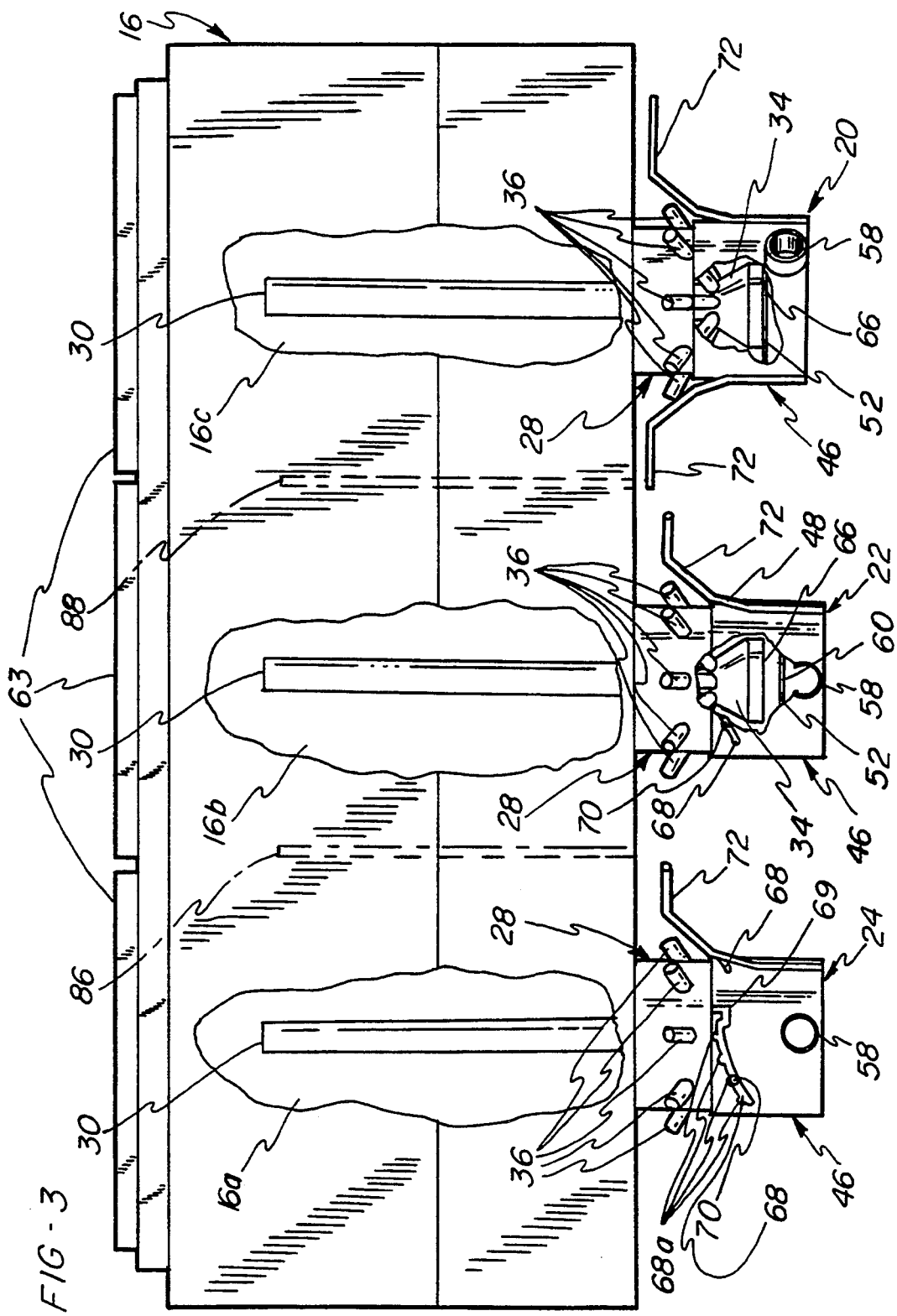
FIG. 3 is a partly broken away front elevational view of the central hopper illustrating different positions for the regulating chambers to control the flow of seed from the central hopper wherein portions of the central hopper and seed distribution units are cut away.

The distribution system 10 further includes a plurality of seed distribution units, depicted by seed distribution units 20, 22 and 24 in FIG. 3, which are mounted to a lower end 26 of the central hopper 16. The seed distribution units 20, 22 and 24 are formed as identical structures and the description of these structures will be made with reference to the seed distribution unit 20, with like reference numerals being used for like elements on the seed distribution units 22 and 24.

Figure 2:
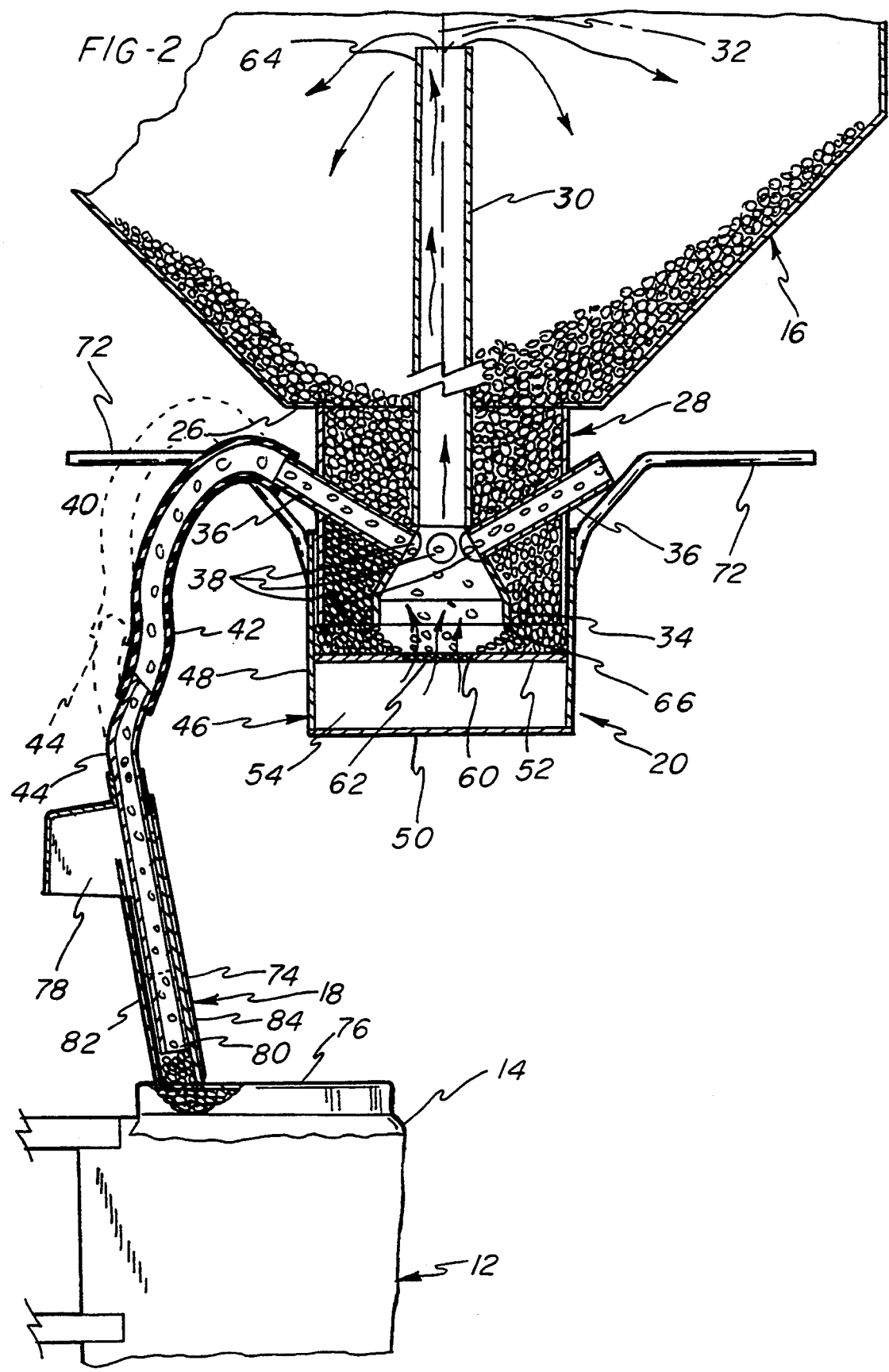
FIG. 2 is a side elevational cross-sectional view illustrating the flow of seed from the central hopper to a metering unit bin.
Figure 4:
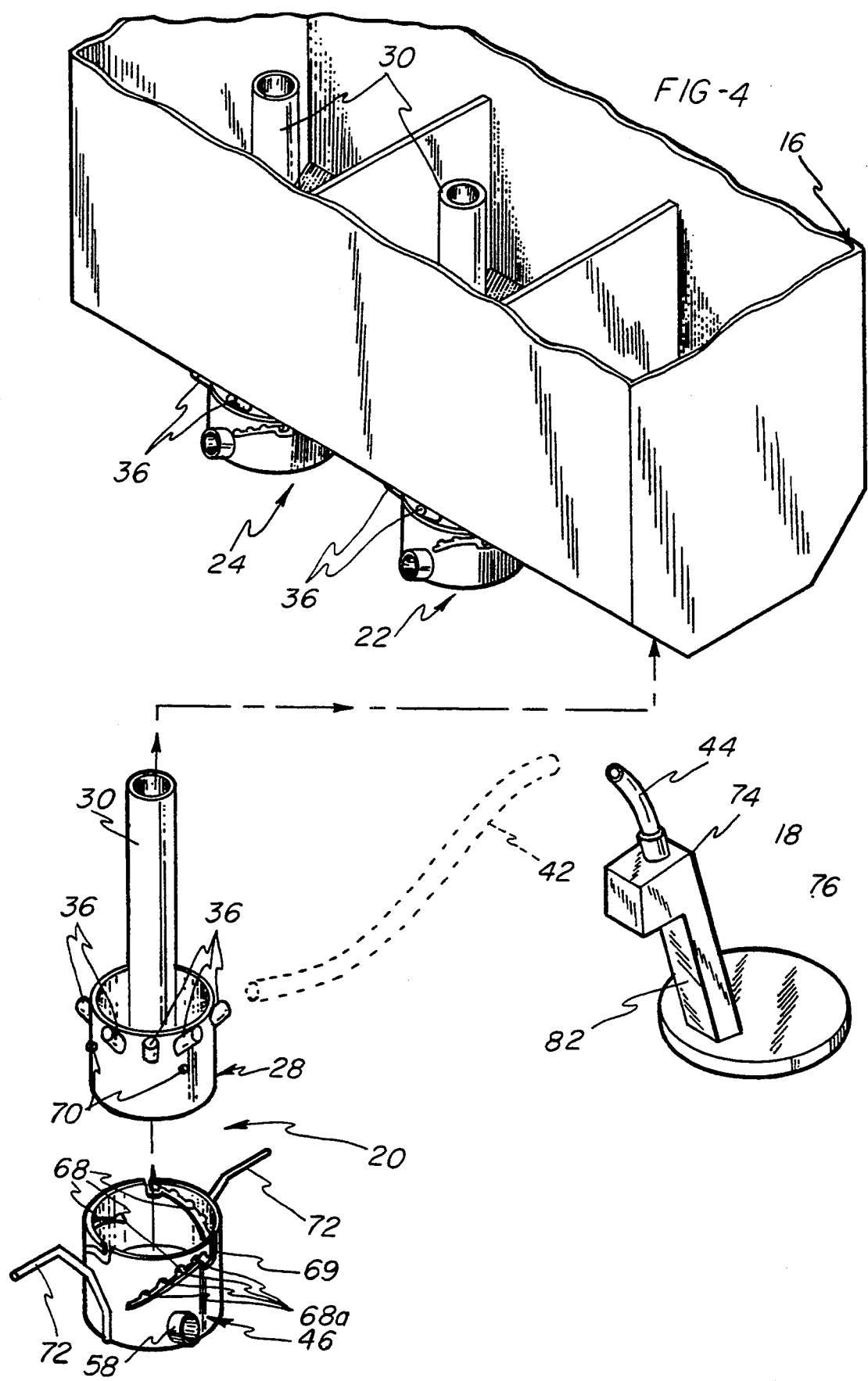
FIG. 4 is an exploded perspective view of the central hopper with the top portion thereof cut away and with one of the seed distribution units shown in exploded perspective view.

As may be best seen in FIGS. 2 and 4, the seed distribution unit 20 includes a cylindrical chamber wall 28 which is attached to the lower end 26 of the central hopper 16. A column means comprising a tubular member 30 is generally centrally located within the chamber wall 28 and defines a longitudinal axis 32 extending substantially vertically through the central hopper 16. The tubular member 30 includes an enlarged lower end 34 (FIG. 2) and is supported relative to the cylindrical wall 28 by means of a plurality of tubular distribution tubes spokes 36. The plurality of tubular distribution tube spokes 36 each extend radially inwardly through and are rigidly attached to apertures in the cylindrical wall 28. They also engage the tubular member 30 adjacent to a lower end 34 at a conical or funnel shaped portion thereof. The plurality of tubular distribution tube spokes 36 and associated apertures define a plurality of discharge outlets 38 for communicating seed from an interior portion of the tubular member 30 to the plurality of metering units 14.

Each of the seed distribution units 20, 22 and 24 preferably include eight distribution tube spokes 36 substantially uniformly spaced about the circumference of the tubular member 30. Each of the distribution tube spokes 36 form a part of a distribution tube assembly 40 including a flexible tube 42 extending from each distribution tube spoke 36 to a discharge tube 44 located at a respective seed unit bin 18. Further, although only one distribution tube assembly 40 has been illustrated in FIGS. 1 and 2, it should be understood that a distribution tube assembly 40 is preferably provided for each of the spokes 36 to feed respective metering unit bins 18 on the planter 12.

Referring further to FIGS. 2 and 4, the seed distribution unit 20 further includes an adjustable support means comprising a cylindrical adjustment member 46 including a cylindrical outer wall 48 positioned in telescoping relation to the chamber wall 28, a circular bottom wall 50 attached to the outer wall 48 and a circular seed support plate 52 located in spaced relation to the bottom wall 50. The chamber wall 28 and adjustment member 46 form a regulating chamber surrounding the enlarged lower end 34 of the tubular member 30 for regulating the flow of seed to the distribution tube assemblies 40, as will be described further below.

The support plate 52, bottom wall 50 and outer wall 48 define a plenum chamber 54 located below the support plate 52. An air supply, such as a blower 56, is provided for supplying air to the interior portions of the tubular support beams 19 and 21, as is illustrated diagrammatically in FIG. 1, and a port 58 formed in the outer wall portion of the plenum chamber 54 is connected in fluid communication with the air passing through one of the support beams 19, 21 whereby air is supplied to the plenum chamber 54. The air is preferably supplied at a high volume flow rate and low pressure and is vented out of the plenum chamber 54 toward the tubular member 30 through an aperture 60 defined in the support plate 52 substantially concentric with the longitudinal axis 32. In addition, a screen 62 is preferably provided extending over the aperture 60 whereby seed is prevented from flowing into the plenum chamber 54.

As air is supplied to the plenum chamber 54, it will form an air column flowing in a first direction upwardly toward the tubular member 30, and as the air flows upwardly it will entrain seed supported on the support plate 52 surrounding the aperture 60 to buoy up the seed toward the discharge outlets 38. At this point, it should be noted that the upper end of the central hopper 16 includes a lid or lids 63 to define a closed chamber such that air passing out of an upper end 64 of the tubular member 30 creates a pressure within the upper portion of the central hopper 16. The air pressure above the seed within the central hopper 16 provides a downward pressure to facilitate feeding of the seed to the bottom of the central hopper 16 and into the seed distributing units 20, 22 and 24. The air pressure also substantially prevents high volume flow of air through the upper portion of the tubular member 30. In this manner, seed is prevented from flowing up through the tubular member 30 such that it is generally limited to being buoyed up within a lower region of the air column where it is available to be dispensed through the discharge outlets 38 in a generally radial outward direction transverse to the direction of air flow in the air column. Thus, a substantially even or uniform distribution of seed to each of the plurality of discharge outlets 38 is provided to ensure a relatively predictable flow rate of seed to each of the metering unit bins 18.

Referring to FIG. 3, the cylindrical adjustment member 46 is vertically adjustable relative to the chamber wall 28, whereby the height of the support plate 52 may be adjusted relative to a lower edge 66 of the tubular member 30. The adjustment of the support plate 52 relative to the lower edge 66 ensures that the proper amount of seed will be entrained within the air column passing through the central hopper 16 for given physical characteristics such as weight, size and geometry of the seed. The physical characteristics of the seed affect the angle of repose for the seed, i.e., the angle at which the seed will flow down from the lower edge 66 of the tubular member 30 toward the aperture 60 in the support plate 52. It is preferable to select a distance between the lower edge 66 and the support plate 52 which matches the angle of repose for the seed in order to ensure that a proper of amount of seed will flow toward the aperture 60.

In the embodiment illustrated, the adjustment of the adjustment member 46 is facilitated by cooperating means comprising a plurality of angled slots 68 formed in the outer wall of the adjustment member 46 which are engaged by cooperating pins 70 attached to the exterior of the chamber wall 28. Rotation of the adjustment member 46 about the longitudinal axis 32 results in upward or downward movement of the adjustment member 46 relative to the chamber wall 28. The slots 68 may also be provided with indentations or detents **68*a* spaced along the length thereof whereby the pins 70 are provided with different resting positions for accommodating a variety of vertical positions of the adjustment member 46 and the ends of the slots 68 are each provided with a U-shaped passage 69 along which the pins 70 may travel during installation and removal of the adjustment member 46. In addition, handles 72 may be provided attached to the outer wall 48 for facilitating rotation of the adjustment member 46**.

FIG. 3 illustrates the adjustment members 46 for the seed distribution bins 20, 22 and 24 in different positions. For example, the adjustment members 46 for the seed distribution units 22 and 24 are located in an intermediate position between the upper and lower limits of travel for the adjustment members 46. The configuration of the passage 69 prevents the adjustment member 46 from inadvertently separating from the chamber wall 28 when the adjustment member 46 is in its lowermost position. The adjustment member 46 for the seed distribution unit 20 is illustrated in an uppermost position wherein the support plate 52 is in contact with the lower edge 66 of the tubular member 30 whereby seed is prevented from traveling into the tubular member 30. The position illustrated by the seed distribution unit 20 is operative to prevent seed from flooding the tubular member 30 when the seed distribution system is not in use.

Referring to FIGS. 2 and 4, the metering unit bin 18 includes a substantially rectangular receptacle portion 74 attached to a metering unit cap 76. The discharge tube 44 for the distribution assembly 40 extends down into the receptacle portion 74 and an air gap is provided along the exterior of the discharge tube 44 to permit air to escape through a vent 78 formed in the upper end of the receptacle portion 74.

The flow of seed through each of the distribution tube assemblies 40 is regulated by the seed level in the metering unit bins 18. As the seed level in any one of the metering unit bins 18 reaches the level of a discharge end 80 for the discharge tube 44, the flow of air through the distribution tube assembly 40 will be restricted to cut off the flow of seed to the metering unit bin 18. In addition, each discharge tube 44 is adjustable along the longitudinal axis of the tube 44 to different vertical positions relative to the receptacle portion 74 (see FIG. 2) such that the amount of seed retained within the bin 18 may be adjusted by positioning the discharge end 80 of the discharge tube 44 at a preselected maximum fill level for the seed. In this manner, each bin 18 may be adjusted to retain a minimum amount of seed for a particular seed flow provided from the central hopper 16.

It should further be noted that the receptacle portion 74 is preferably constructed with transparent front and back sides 82, 84 to permit observation of the seed level within the receptacle portion 74.

Referring to FIG. 3, the central hopper 16 is further provided with partitions 86, 88 for dividing the central hopper 16 into subsections **16*a*, 16*b* and 16*c* to thereby separate the seeds supplied to each of the seed distribution units 20, 22 and 24. In addition, it should be noted that a hose may be attached to the upper end of each of the tubular members 30 and directed to a collection bin or hopper (not shown) whereby seed may be efficiently removed from each of the subsections 16*a*, 16*b* and 16*c* of the central hopper 16 by means of the air pressure entering the central hopper 16 through the plurality of seed distribution units 20, 22 and 24 when a planting operation has been completed, for example. Further, the seed may also be removed from the individual subsections 16*a*, 16*b* and 16*c* by removing the adjustment members 46 from the chamber walls 28 by guiding the pins 70 through the passages 69 to the open ends thereof. Thus, it is possible to drain the seed out of each subsection 16*a*, 16*b* and 16*c*** individually by gravity flow.

From the above description, it should be apparent that the present invention provides a seed distribution system wherein a substantially uniform seed flow is provided through a plurality of distribution tubes feeding seed metering units on a planter. In addition, adjustment of the seed flow through the plurality of distribution tubes may be simultaneously effected through the adjustable support means while maintaining the uniform distribution of seed being fed to the seed metering units.

Advantageously, the present invention provides a simple and effective means for adjusting and maintaining a preselected seed level at each of the metering units on the planter.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An apparatus for distributing particulate material from a central hopper to at least one receiving unit, said apparatus comprising:

a column structure defining an air column within said central hopper, said column structure comprising an upper end and a lower end;

a plurality of discharge outlets coupled to said column structure in fluid communication with said air column intermediate said upper end and said lower end; and an air supply for supplying air in a first direction to said column structure, said air supply being capable of buoying said particulate material within said column structure such that said particulate material may be distributed through at least one of said plurality of discharge outlets.

2. The apparatus as in claim 1 wherein said air supply comprises adjustable support means for supporting said particulate material in adjustable relationship with said lower end of said column structure and also for directing air in said first direction up through said column structure.

3. The apparatus as in claim 2 wherein said adjustable support means further comprises a support plate which is capable of supporting said particulate material; said support plate comprising an aperture for directing said air supply towards said lower end of said column structure.

4. The apparatus as in claim 1 wherein said column structure comprises a tubular member and each of said plurality of discharge outlets are spaced substantially evenly about said tubular member.

5. The apparatus as in claim 1 wherein each of said plurality of discharge outlets comprise a distribution tube having a first end which extends radially from said air column and a second end which may be operatively coupled to said at least one receiving unit.

6. The apparatus as in claim 5 wherein said at least one receiving unit comprises a metering unit bin, said distribution tubes further comprising a discharge end opening into said metering unit bin, said discharge end being movable within said metering unit bin to control the amount of material contained in said metering unit bin.

7. The apparatus as in claim 1 wherein said particulate material is seed.

8. The apparatus as in claim 1 wherein said air supply includes an adjustable member for directing air into said column structure, said adjustable member being adjustable relative to said lower end for controlling the flow of said particulate material into said column structure.

9. An apparatus for distributing particulate material from a central hopper to at least one receiving unit, said apparatus comprising:

a column structure defining an air column within said central hopper, said column structure comprising upper end and a lower end;

a plurality of discharge outlets located intermediate said upper end and said lower end;

an air supply for supplying air in a first direction to said column structure, said air supply being capable of buoying said particulate material such that said particulate material may be distributed through at least one of said plurality of discharge outlets; and wherein each of said plurality of discharge outlets comprise a distribution tube coupled to said column structure for conveying said particulate material from said air column in a second direction which is generally transverse to said first direction.

10. A seed distribution system for distributing seed from a central hopper to a plurality of seed bins, said system comprising:

a tubular member extending within said central hopper and including a lower end associated with a lower portion of said central hopper, a plurality of distribution tubes in fluid communication with an inner portion of said tubular member through a plurality of discharge outlets, a regulating chamber located adjacent to said lower end of said tubular member and including a support plate for supporting seed to be discharged from said central hopper, said support plate defining an aperture, and an air supply for supplying air to said central hopper through said aperture whereby an air column passing into said tubular member is formed, said air column entraining said seed supported on said support plate and causing said seed to be buoyed up into said tubular member for discharge through said discharge outlets.

11. The system as in claim 10 wherein said tubular member includes an enlarged lower end for receiving said seed buoyed up by said air column.

12. The system as in claim 11 wherein said discharge outlets are located adjacent to said enlarged lower end.

13. The system as in claim 10 wherein said central hopper includes an enclosed upper portion and said tubular member includes an upper end which opens into said upper portion, said seed being prevented from traveling to said upper end of said tubular member by an air pressure created within said upper portion of said central hopper.

14. The system as in claim 10 wherein said support plate is movable relative to said tubular member whereby the distance between said support plate and said lower end of said tubular member is adjustable.

15. The system as in claim 14 wherein said support plate is movable to a position in contact with said lower end of said tubular member for preventing material from entering said tubular member.

16. The system as in claim 14 wherein said regulating chamber is formed by a cylindrical chamber wall surrounding said lower end of said tubular member and a cylindrical adjustment member supporting said support plate and surrounding said chamber wall in telescoping relationship wherein rotation of said adjustment member relative to said chamber wall causes said distance between said support plate and said lower end of said tubular member to be adjusted.

17. The system as in claim 10 wherein each of said distribution tubes include a discharge end opening into a respective seed bin, each said discharge end being movable in a longitudinal direction to control the amount of seed contained within said respective seed bin.

18. A seed distribution system for distributing seed from a central hopper to a plurality of seed bins on seed metering units for use with a planter, said system comprising a plurality of seed distribution units mounted to a lower portion of said central hopper, each said seed distribution unit including:

a tubular member defining a longitudinal axis extending in a substantially vertical direction within said central hopper and including an enlarged lower end located adjacent to said lower portion of said central hopper, a plurality of distribution tubes in fluid communication with an inner portion of said tubular member through a plurality of discharge outlets formed through said tubular member adjacent to said enlarged lower end, a regulating chamber surrounding said enlarged lower end of said tubular member, said regulating chamber including a cylindrical chamber wall substantially concentric with said longitudinal axis and a cylindrical adjustment member surrounding said chamber wall in telescoping relationship, a support plate attached to said adjustment member for supporting seed below said enlarged lower end of said tubular member, said support plate defining an aperture substantially concentric with said longitudinal axis, first and second cooperating means on said chamber wall and said adjustment member, respectively, said first and second cooperating means being operative to cause said support plate to move toward and away from said tubular member in response to rotation of said adjustment member about said longitudinal axis, and an air supply including a plenum chamber formed in said adjustment member below said support plate for supplying air to said central hopper through said aperture whereby an air column passing into said tubular member is formed, said air column entraining said seed supported on said support plate and causing said seed to be buoyed up into said tubular member for discharge through said discharge outlets.

19. A method of distributing material from a central hopper in an agricultural implement comprising the steps of:

(a) buoying said material in a tubular member which is positioned within said central hopper, said tubular member including an upper end and a lower end comprising a plurality of distribution tubes which extend substantially radially therefrom intermediate said upper end and said lower end, and (b) causing said material to be discharged from said central hopper through said plurality of distribution tubes to a receiving unit.

20. The method as in claim 19 wherein said step (b) further comprises the step of:

adjustably supporting said material in operative relationship with said lower end of said tubular member.

21. The method as in claim 19 wherein said central hopper further comprises an adjustment member having a support plate for supporting said material, said step (b) further comprising the step of:

adjusting said adjustment member such that said material is operatively associated with said lower end of said tubular member to facilitate said material being distributed through said tubular member and said distribution tubes.

22. The method as in claim 19 wherein said step (a) further comprises the step of:

causing a column of air to flow upwardly within said central hopper toward said tubular member.

23. The method as in claim 19 further comprising the step of:

(c) simultaneously adjusting a flow rate of said material through said plurality of distribution tubes.

24. The method as is in claim 19 wherein said upper end of said tubular member is open to said central hopper and including the step of causing air to flow from said lower end and out of said upper end into said central hopper.

* * * * *